(12) United States Patent
Zampollo

(10) Patent No.: US 12,516,458 B2
(45) Date of Patent: Jan. 6, 2026

(54) CO-MINGLING OF PARTICULAR MATERIAL AND CO-AXIAL-MELTBLOWN FIBERS

(71) Applicant: TEKNOWEB MATERIALS S.R.L., Palazzo Pignano (IT)

(72) Inventor: Fabio Zampollo, Crema (IT)

(73) Assignee: The Procter & Gamble Company, Cincinnati, OH (US)

( * ) Notice: Subject to any disclaimer, the term of this patent is extended or adjusted under 35 U.S.C. 154(b) by 751 days.

(21) Appl. No.: 17/774,083

(22) PCT Filed: Nov. 5, 2020

(86) PCT No.: PCT/EP2020/081186
§ 371 (c)(1),
(2) Date: May 3, 2022

(87) PCT Pub. No.: WO2021/089731
PCT Pub. Date: May 14, 2021

(65) Prior Publication Data
US 2022/0364284 A1 Nov. 17, 2022

(30) Foreign Application Priority Data
Nov. 5, 2019 (GB) ..................................... 1916086

(51) Int. Cl.
*D04H 1/736* (2012.01)
*D01D 4/02* (2006.01)
(Continued)

(52) U.S. Cl.
CPC ............. *D04H 1/736* (2013.01); *D01D 4/025* (2013.01); *D01D 13/02* (2013.01); *D04H 1/407* (2013.01);
(Continued)

(58) Field of Classification Search
CPC .. D04H 1/56; D04H 3/16; D04H 5/08; D04H 1/407; D04H 1/4382; D04H 1/565;
(Continued)

(56) References Cited

U.S. PATENT DOCUMENTS

| 6,164,950 A | 12/2000 | Barbier et al. |
| 8,017,534 B2 | 9/2011 | Harvey et al. |

(Continued)

FOREIGN PATENT DOCUMENTS

| WO | 2009002612 A1 | 12/2008 | |
| WO | WO-2009105490 A1 * | 8/2009 | ............. B32B 5/022 |

OTHER PUBLICATIONS

International Search Report and Written Opinion for International Patent Application No. PCT/EP2020/081186, mailed Jan. 25, 2021, 14 pages.

*Primary Examiner* — Lynda Salvatore
(74) *Attorney, Agent, or Firm* — James E. Oehlenschlager

(57) ABSTRACT

The present invention relates to the manufacturing equipment for web materials comprising fibers and particulate material, to a process of operating such an equipment and to particular materials resulting therefrom. Coaxially meltblown fibres are combined with a stream of particulate or short fiber material and the resulting commingled mixture is deposited onto a collector. The meltblown fibers are formed by nozzles which are divided into two or more sub-arrays configured to produce two or more different types of fiber, having e.g. different diameters and/or polymer composition.

8 Claims, 8 Drawing Sheets

(51) Int. Cl.
  *D01D 13/02* (2006.01)
  *D04H 1/407* (2012.01)
  *D04H 1/4382* (2012.01)
  *D04H 1/56* (2006.01)
  *D04H 3/02* (2006.01)
  *D04H 3/14* (2012.01)
  *D04H 3/16* (2006.01)

(52) U.S. Cl.
  CPC ........... *D04H 1/4382* (2013.01); *D04H 1/565* (2013.01); *D04H 3/02* (2013.01); *D04H 3/14* (2013.01); *D04H 3/16* (2013.01); *D10B 2401/022* (2013.01)

(58) Field of Classification Search
  CPC ........... D04H 1/70; D04H 1/736; D04H 3/02; D04H 3/14; D04H 1/26; D04H 3/005; D04H 5/06; D01D 13/02; D01D 4/025; B29C 48/345; B32B 2250/02; B32B 2250/03; B32B 2250/20; B32B 2250/40; B32B 2262/02; B32B 2262/062; B32B 2262/144; B32B 2264/025; B32B 2307/718; B32B 2307/726; B32B 2307/728; B32B 2432/00; B32B 5/028; B32B 5/08; B32B 5/26; A47L 13/16
  See application file for complete search history.

(56) References Cited

U.S. PATENT DOCUMENTS

2015/0322601 A1  11/2015  Brown et al.
2016/0355950 A1  12/2016  Young

* cited by examiner

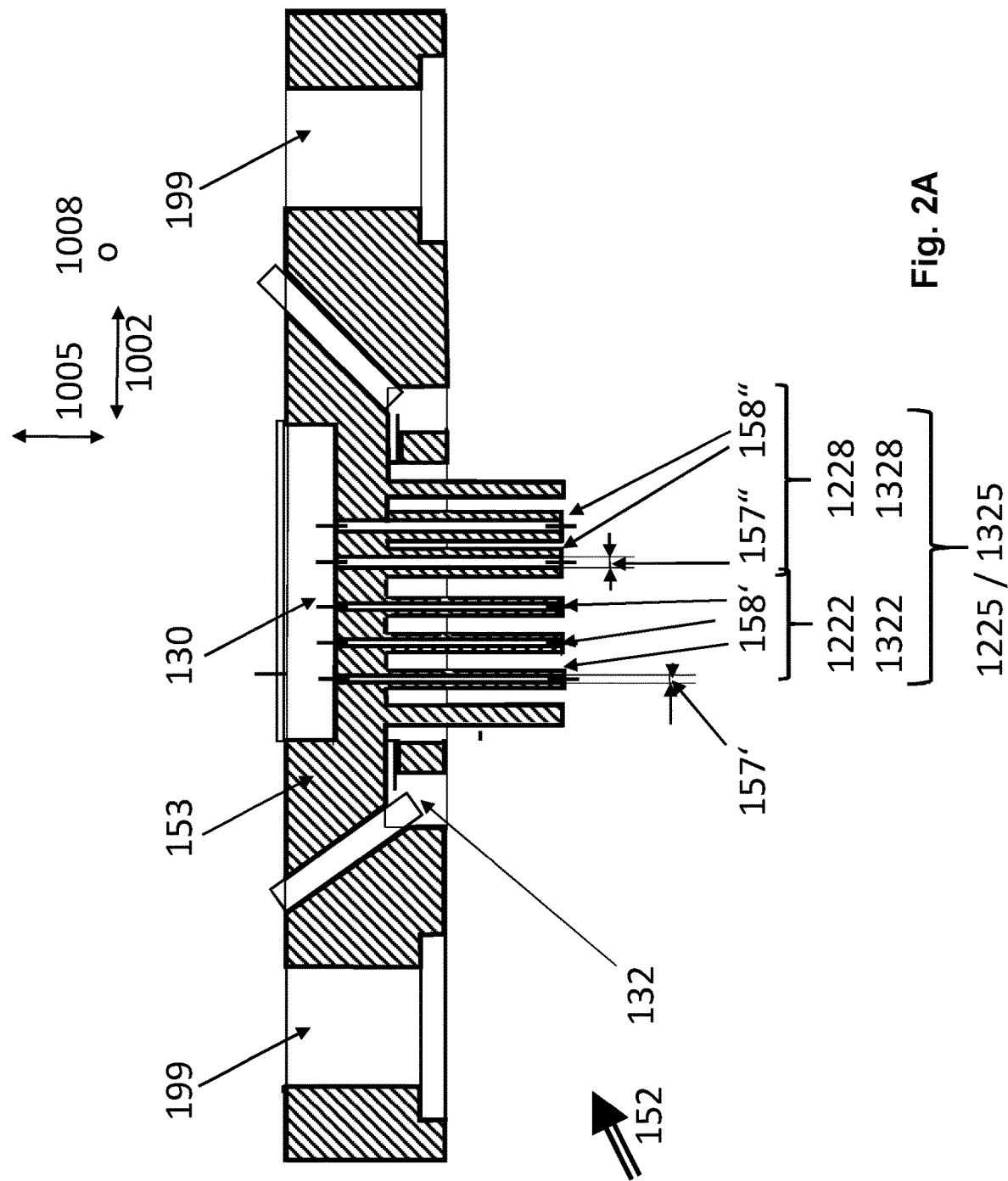

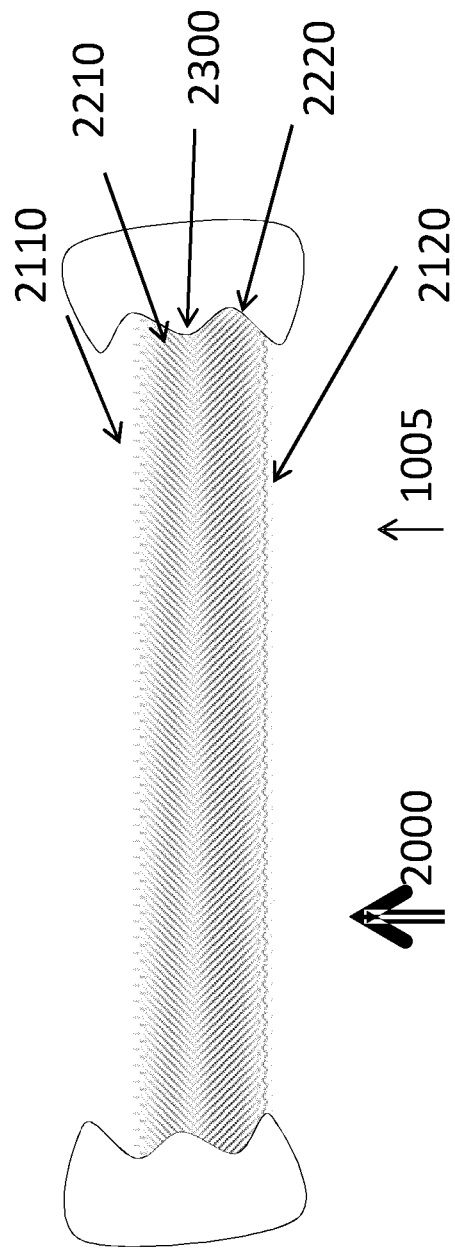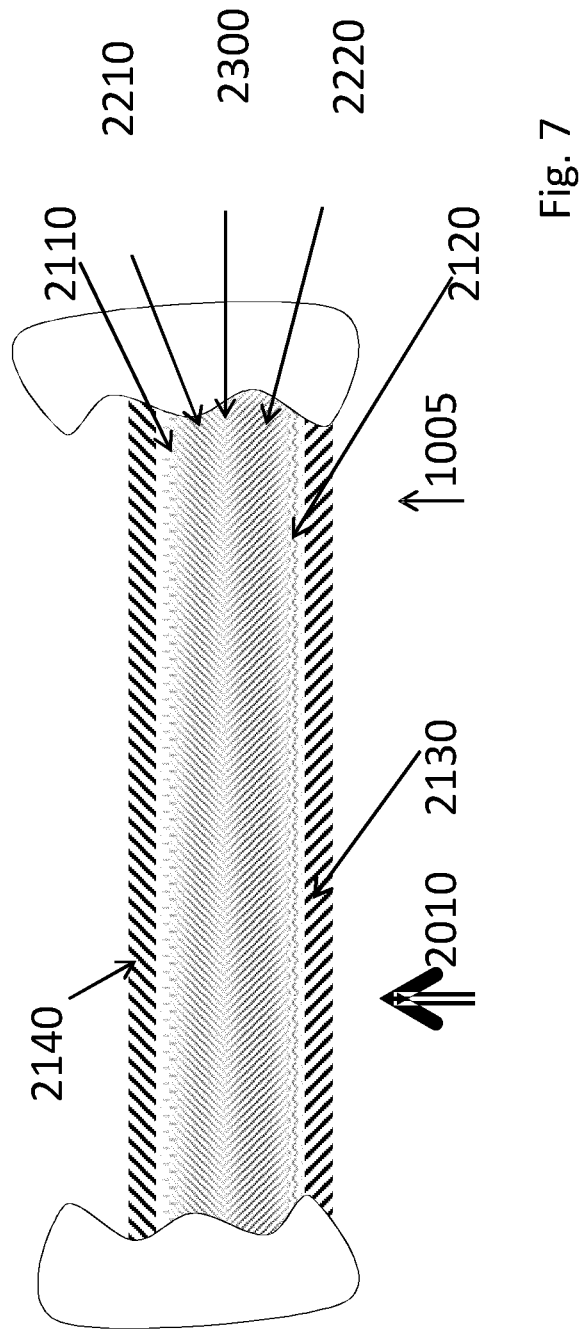

CO-MINGLING OF PARTICULAR MATERIAL AND CO-AXIAL-MELTBLOWN FIBERS

CROSS-REFERENCE TO RELATED APPLICATIONS

This application is a National Phase application based on International Patent Application No. PCT/EP2020/081186 filed on Nov. 5, 2020, and that claims priority to and benefit of United Kingdom Patent Application Serial Nos. 1916086.0 filed on Nov. 5, 2019, the contents of which are hereby incorporated in their entireties.

FIELD OF THE INVENTION

The present invention relates to the manufacturing equipment for web materials comprising fibers and particulate material, to a process of operating such an equipment and to particular materials as may be resulting therefrom.

BACKGROUND/KEY PRIOR ART

"Coforming" and/or "coforming process" as used herein refers to a well-known process by which two or more separate materials are commingled, whereby typically filaments, such as polymer filaments, are combined with one or more other material(s), for example particulate materials, such as short fibers, for example pulp fibers, or particles. The mixture of filaments and particulate materials can be collected to form a fibrous structure.

Such structures can be used in a wide variety of applications including absorbent media for aqueous and organic fluids, filtration media for wet and dry applications, adsorbent media for removing gaseous fluids or components, insulating materials, protective cushioning materials, containment and delivery systems and wiping media for both wet and dry applications, and particularly for baby wipes. Liquid absorbency may well be enhanced by the use of particulate absorbent or superabsorbent polymer (SAP) material, as may be provided as particulate material in particle or fiber form.

In many of the applications, the use of filaments enhances significantly the usability of the structures that would otherwise be impeded by the lack of integrity of the particulate material alone: So provide pure wood pulp fiber structures very little mechanical integrity and a high degree of collapse when wetted. Similarly, at least when using high amounts of SAP—up to pure SAP—the integrity and immobilization can be almost non-existent. Combining these with thermoplastic fibrous materials can greatly enhance the properties of such structures including both wet and dry tensile strength, in particular when the thermoplastic fibrous materials are formed into filaments in situ, i.e. essentially at the same time as being combined with the particulate material.

It has further been found advantageous to use melt-blown fibers as an outside layer of the fibrous structure, see e.g. U.S. Pat. No. 8,017,534/EP2265756 (K-C), aiming at providing homogeneously formed fibrous structures comprising melt-blown fibrous materials and at least one secondary fibrous material, such as pulp, as may be used as a moist wipe. The structure may be formed by providing a first stream and a second stream of melt-blown fibrous materials from melt-blowing dies, and commingling these with a stream of natural fibers, e.g., pulp fibers, in a formation zone, from where it is collected on a forming wire.

Each melt-blowing die is configured so that two streams of attenuating gas per die converge to form a single stream of gas which entrains and attenuates molten threads, as these exit small holes or orifices in the melt-blowing die. As for well-known melt-blowing processes, the attenuating gas, typically air, is provided at an angle of about 60° to the filament stream direction, which is also referred to as "air knife".

WO2017004117/WO2017004116 (P&G, Burt et al.) disclose a co-formed fibrous web structure with a co-formed core layer sandwiched between two scrim layers. The core layer may be formed of a blend of cellulose pulp fibers and melt spun filaments, the scrim layers may be formed of melt spun filaments, whereby the melt-spun may be melt-blown filaments. The scrim layers may have a combined basis weight of from 0.1 g/m$^2$ to less than 3.0 g/m$^2$. Further, it is described whereby a plurality of fibers, e.g. pulp fibers, may be commingled with a plurality of filaments, e.g. polypropylene filaments.

As a variant of the melt-blowing systems employing the "air knife" systems as described above, WO2009002612 (3M) micro and meso melt-blown fibers describes a single row of orifices of two diameters, thereby creating porous nonwoven webs comprising melt-blown fibers that present a bimodal mixture of micro fibers and meso fibers, that may be combined with staple fibers.

U.S. Pat. No. 5,665,278 (J&M) describes melt-blown thermoplastic fibers that are cooled, or quenched, by micro-sized water droplets produced by airless nozzles, with droplets having an average diameter of less than 20 microns.

Even further, it is known to employ different types of polymers in a single die head, such as described in U.S. Pat. No. 6,164,950 (Freudenberg), relating to using two types of polymer of the polyester type exhibiting a difference in melting temperature of between 5° C. and 50° C. for multi row spunbonding by separate melt channels as well as insulating channels operated at different temperatures.

In contrast to the "air-knife" melt-blowing systems as described herein above, WO2009010940 (P&G) describes forming a fibrous co-formed structure by using multi row melt-blowing system with essentially parallel, i.e. angled at less than about 10°, air flow, also may also be referred to as "Co-Axial meltblowing" or hereinafter "CA-meltblowing".

Such a filament forming system is also known from U.S. Pat. Nos. 5,476,616 or 9,303,334 (Biax), hereinafter referred to as U.S.'616 and U.S.'334, respectively, wherein a "hybrid system" between spun-bonding and melt-blowing is described and referred to as "spun-blowing®". The apparatus comprises a die block and a spinneret secured thereto, as well as a plurality of nozzles secured to the spinnerette, grouped into an array of a plurality of rows and a plurality of columns.

Further at least the nozzles are surrounded by essentially concentrically arranged openings adapted to allow pressurized gas to pass through and shroud the filaments as these are exiting the nozzles, such that the essentially continuous filaments are solidified and attenuated into fibers, to be further collected on a lay-down belt by means of a high amount of suction from a vacuum box underneath.

As described in e.g. U.S.'334, the periphery around all of the extruded filaments/fibers from the array of nozzles may be shrouded by another pressurized gas curtain to isolate them from the surrounding ambient air. It is further mentioned that the nozzle openings may exhibit differing sizes.

A further improvement for a coforming process is described in US20160355950 (P&G). Accordingly, two or more separate materials, for example solid additives such as short fibers and/or particulates, and filaments are commingled in a forming box. Such a forming box may comprise a housing with one or more filament inlets, and one or more solid additive inlets. The filaments may be provided from a polymer filament source, such as a filament forming die, and the streams of filaments and solid additives may commingle in the box at an angle of less than 90° to each other. Such a set up aims at providing superior commingling of the materials at significantly reduced vacuum suction compared to e.g. a system described in cited U.S.'334.

WO2020/099193 (filed as PCT/EP2019/080293, TKWM) describes a particular CA-meltblowing die block whereby a spinneret block comprises nozzles that are unitary with the spinneret body. The nozzles are arranged in an array of nozzles that may be arranged in sub-arrays. Further, the nozzles may be chamfered so as to allow a smooth polymer flow through the capillaries of the nozzles.

WO2020/104190 (filed as PCT/EP2019/080291; TKWM) describes a further particular CA-meltblowing die block, wherein the nozzles are removable from the spinneret block. Further, the nozzles may be chamfered so as to allow a smooth polymer flow through the capillaries of the nozzles. Die spinneret block may further comprise grooves, which when filled with a sealant allow to select respectively deselect rows of the spinneret block.

SUMMARY OF THE INVENTION

The present invention is a web forming apparatus adapted to form a commingled web comprising
particulate material selected alone or in combination from the group consisting of short fibers, preferably pulp fibers, and particles, preferably superabsorbent particles
synthetic fibers of the CA-meltblown type,
whereby the apparatus comprises
a particulate material supply system oriented to deliver an essentially/predominantly/generally vertically downwardly moving stream of particulate material;
at least one polymer supply system adapted to provide polymer material to
a first and a second multi-row CA-meltblowing system, wherein each of the systems is adapted to form CA-meltblown fibers and comprises
an array of polymer releasing orifices comprising at least two essentially cross-directionally extending rows of polymer releasing orifices,
a forming box
adapted to form commingled material comprising the particulate material and CA-meltblown fibers
the forming box comprising
a particulate material inlet connected to the particulate material supply system;
two CA-meltblown fiber inlets each connected to one of the CA-meltblowing systems,
and a commingled material outlet,
a collector, preferably a forming belt
for collecting commingled short and CA-meltblown fibers from the commingled fiber outlet of the forming box,
adapted to move along a machine direction of the apparatus,
optionally exhibiting protrusions for creating patterned or textured structure in the web,
whereby each one of the CA-meltblowing inlets of the forming box is positioned machine-directionally before ("upstream") and after ("downstream") the particulate material inlet.

The array of polymer releasing orifices comprises at least a first and a second sub-array, each sub-array comprising at least one, preferably at least 2, more preferably at least 4, most preferably 6 or more rows of orifices,
whereby the orifices of at least one of the sub-array are adapted to release fibers of different properties than the orifices of a different sub-array,
by one or more of the features selected form the group consisting of
orifices of the sub-arrays exhibiting differing orifice diameters;
orifices of the sub-arrays are connected to polymer supply systems
for differing polymer types;
for differing polymers throughput;
for differing polymer supply pressure
orifices of the sub-arrays are connected to independent temperature control systems.

The apparatus may further comprise a quenching system comprising
a first quenching device machine directionally positioned upstream of the first CA-meltblowing system;
a second quenching device machine directionally positioned between the first CA-meltblowing system and the particulate material inlet;
a third quenching device machine directionally positioned between the particulate material inlet and the second CA-meltblowing system;
a fourth quenching device machine directionally positioned downstream of the second CA-meltblowing system;
whereby each of the quenching devices is adapted to release a first, second, third, and fourth quenching fluid stream, respectively, into the forming box.

The quenching devices comprise quenching fluid stream control systems adapted to control properties of at least one of the quenching fluid streams independently from at least one other of the quenching fluid streams by control means of the control systems which are selected alone or in combination from the list consisting of
connecting the quenching devices to quenching fluid of different type, preferably selected from the group consisting of air, water, and steam;
quenching fluid temperature control means;
quenching fluid supply pressure adjustment means;
quenching fluid supply flow rate;
quenching fluid exit angle
relative to CA-meltblowing head;
relative to particulate material delivery axis.

The apparatus may further comprise one or more of the features selected from the group consisting of
removable nozzles, more preferably chamfered, grooved die heads;
a unitary die head comprising a spinneret block and nozzles;
variable die head angles relative to the die head axis;
Bico-nozzles connected to separate polymer supply systems.

The sub-arrays of both CA-meltblowing systems may comprise orifices exhibiting a larger diameter than orifices of the respective other sub-arrays are positioned machine directionally towards the particulate material inlet.

The apparatus may further comprise at least one web forming element positioned up- and/or downstream of the forming box and adapted to extrude filaments and forming scrim layers on the outer surfaces of the commingled web.

The present invention is also a process for forming a commingled web comprising the steps of
providing
particulate material, selected alone or in combination from the group consisting of
short fibers, preferably pulp fibers;
and particles, preferably superabsorbent particles;
one or more type(s) of polymeric material;
an apparatus as described in the above;
feeding the particulate material to the forming box;
forming at least two types of CA-meltblown filaments from the polymeric material in the CA-meltblowing systems
for forming fibers differing in at least one property selected from the group consisting of
providing different polymer types;
providing differing polymer throughput;
providing differing polymer supply pressure;
feeding these into the forming box;
collecting co-mingled web on a collection device;
removing the collected commingled web from the apparatus.

The process may further comprise the steps of
positioning quenching devices for delivering the quenching fluids into the forming box such that for each of the CA-meltblowing systems one quenching device is positioned upstream thereof and one downstream thereof;
feeding streams of quenching fluids into the forming box
by positioning quenching devices for delivering the quenching fluids such that for each of the CA-meltblowing systems one quenching device is positioned upstream thereof and one downstream thereof;
adjusting properties of the streams of quenching fluids to the properties of the respective CA-meltblown fibers by adjusting one or more of the properties selected from the group consisting of
quenching fluid type preferably air, water, or steam;
temperature;
flow rate;
velocity;
direction;
forming a first scrim layer, preferably by extruding polymeric filaments, and depositing the first scrim layer upstream of the forming box on the collector;
forming a second scrim layer, preferably by extruding polymeric filaments, and depositing the second scrim layer downstream of the forming box on the collector.

The present invention is also a commingled web
comprising
particulate material selected alone or in combination from the group consisting of short fibers, preferably pulp fibers, and particles, preferably superabsorbent particles;
synthetic fibers of the CA-meltblown type,
exhibiting an x-, y-, and z-(thickness) direction,
comprising a first and a second surface region extending x-y-directionally,
comprising synthetic fibers of the CA-meltblown type, and being essentially free of the particulate material;
comprising a central region positioned z-directionally between the surface regions,
comprising
commingled particulate material
and synthetic fibers of the CA-meltblown type,
characterized in that
the synthetic fibers of the CA-meltblown type comprised in the central region differ substantially from the fibers of the surface region(s),
by at least one of the properties selected from the group consisting of
fiber diameter;
polymer type;
fiber type;
average fiber length;
fiber strength.

The synthetic fibers of the CA-meltblown type of the central region of the commingled web may further comprise at least a first and a second plurality of fibers of the CA-meltblown type, differing in one or more fiber property/ies selected from the group consisting of
fiber diameter,
polymer type;
fiber type;
average fiber length;
fiber strength.

The first and second type of synthetic fibers of the first and second surface regions of the commingled web may optionally be essentially equal.

The commingled web may further comprise at least one scrim layer forming the outer surface(s) of the commingled web, whereby the scrim layer(s) exhibit a basis weight of less than 10 g/m$^2$, preferably less than about 5 g/m$^2$, more preferably less than about 3 g/m$^2$ and preferably more than about 0.1 g/m$^2$.

The commingled web may exhibit a basis weight of more than about 20 g/m$^2$, preferably more than about 35 g/m$^2$, more preferably more than about 45 g/m$^2$, and less than about 500 g/m$^2$, preferably less than about 100 g/m$^2$, more preferably less than about 70 g/m$^2$.

The particulate material of the commingled web may be present at more than about 50%, preferably more than about 70%, more preferably more than 85%, or even more preferably more than about 90% or more than about 95% based on the total weight of the commingled web, including the scrim layer(s), if present.

The present invention relates further to the use of a commingled web for the manufacturing of a wipe.

BRIEF DESCRIPTION OF THE DRAWINGS

FIG. 5 depicts a cross-sectional through a commingled web according to the present invention.

FIG. 7 depicts a cross-sectional through an another commingled web according to the present invention.

Same numeral refers to same or equivalent features and single or multiple apostrophes indicate multiple equivalent features, e.g. "first and second", or "right and left". Drawings are schematic and not to scale.

DETAILED DESCRIPTION OF THE PRESENT INVENTION

Figure 1:
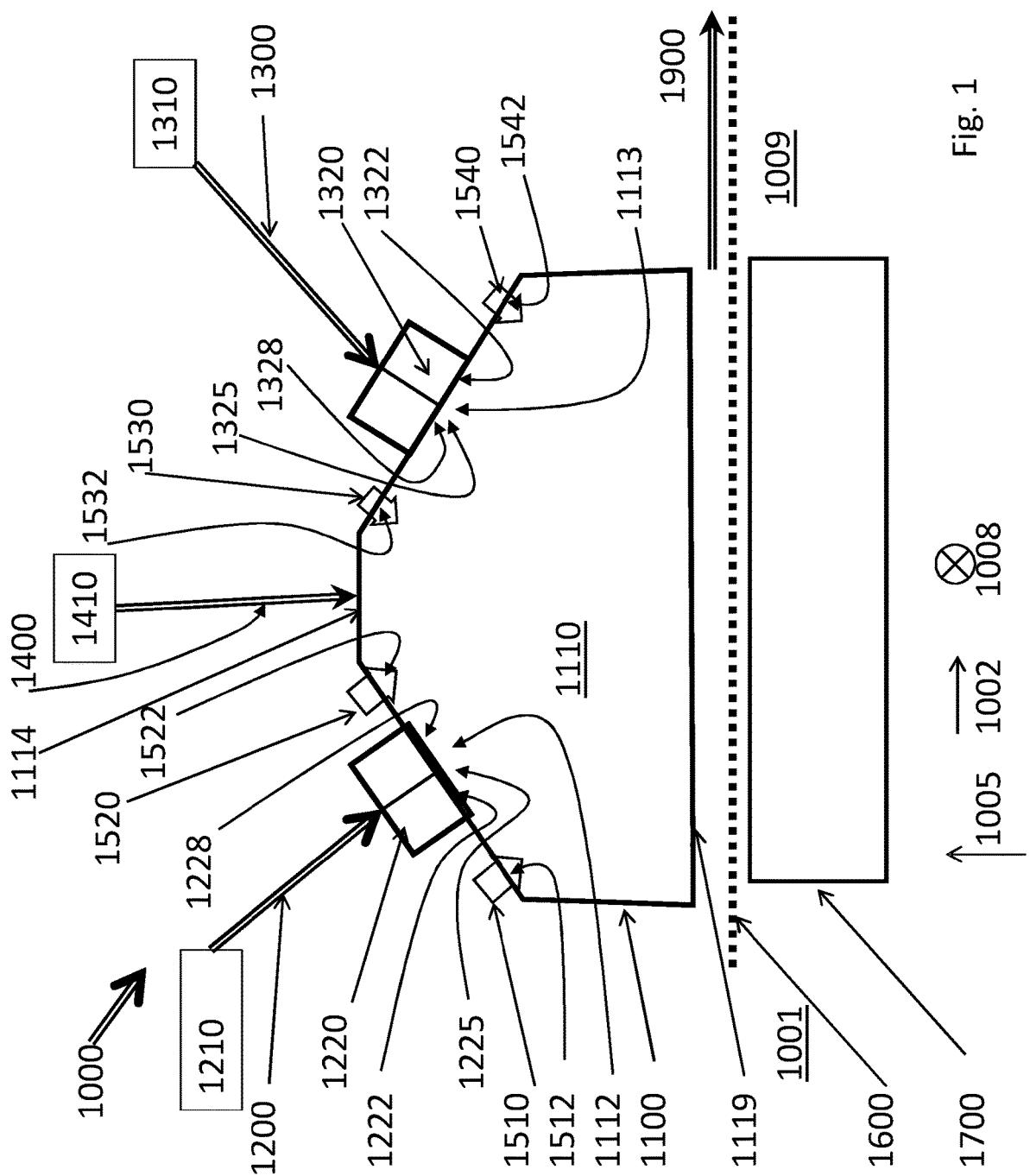
FIG. 1 depict the set-up of an equipment according to the present invention.

In certain aspects, the present invention relates to an equipment for a continuous production of a web and a process to operate such an equipment.

The term "machine direction" (MD) or x-direction corresponds to the direction generally aligned with the direction of manufacturing of the web, and "cross direction" or y-direction perpendicularly thereto.

Generally, MD and CD are horizontally aligned and both are perpendicular to the vertical along or against gravity.

However, the skilled person will readily realize, that MD may be outside of the horizontal, if the continuous manufacturing includes some upward or downward movement.

For the relational positioning of elements of the equipment, the terms "upstream", "downstream" and related terms are commonly used to describe the relative positioning along the manufacturing path on the equipment.

Further, the terms "upper", "lower" and related terms, are commonly used to explain the positioning relative to gravity. However, the skilled person will readily realize when certain executions may be tilted or even tilted over without losing their functionality as described herein.

When considering a material, especially a web material, the thickness or z-directional extension is typically much smaller than MD or CD, the latter referring to the orientation of the web material as made. Typically, though not necessarily, MD and CD of a web can be identified by a person skilled in the art.

"Polymeric filaments" are typically considered continuous or substantially continuous in nature. Non-limiting examples of filaments include melt-blown, spun-bond, or CA-meltblown filaments, which may be essentially continuous or which may break up into broken filaments, as described below. Non-limiting examples of materials that can be formed into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments. In one example, the polymer filaments of the present invention comprise a thermoplastic polymer, for example a thermoplastic polymer selected from the group consisting of: polyolefins, such as polypropylene and/or polyethylene, polyesters, polyvinyl alcohol, nylons, polylactic acid, polyhydroxyalkanoate, polycaprolactone, and mixtures thereof In one example, the thermoplastic polymer comprises a polyolefin, for example polypropylene and/or polyethylene. In another example, the thermoplastic polymer comprises polypropylene.

Other suitable polymeric filaments can be made from curable liquid binder systems comprising high concentrations of one or more binder compound(s) in a solvent or carrier, preferably water, as described in more detail in the application GB2005832.7 (unpublished, TKWM), to which express reference is made to the binder systems and their processing.

The term "fibers" includes naturally occurring fibers, such as wood pulp fibers, modified natural material fibers, such as cellulosed based formed fibers such as Viscose® or Rayon®, or synthetic polymer based fibers. Within the present context, distinction is made between short fibers such as cellulose pulp fibers, or staple fibers, that are pre-made and supplied as fibrous material (even though they might need to be disintegrated, as well known for cellulose pulp, as may be delivers in roll-form or bales, which are opened to create the fibers, typically individualized fibers), and filament fibers, that are formed from molten polymer in situ, e.g. in course of the process according to the present invention.

The term "different polymer types" relates in a first aspect to polymers of different chemical species, such a polyester or polyethyleneterephtalate vs. polypropylene vs. polyethylene. In a second aspect it refers also to polymers of the same species, if the properties are different such as by different polymer chain length, melt flow index or additives. Two fiber types may also differ if for example two bi- or multi-component fibers exhibit a different amount of the constituents or a different geometric arrangement, e.g. core-sheath versus side by side.

Within the current context, the term "particulate material" may relate to pre-formed, discontinuous, typically short individual fibers, such as cellulose pulp fibers or short synthetic fibers such as staple fibers, and particles, such as functional particles as being adsorptive, e.g. for being used in odor adsorbing structure, or being absorptive, such as liquid absorbent, like superabsorbent polymers (SAP), e.g. of the polyacrylate type. Such short fibers typically exhibit a length to diameter ratio of at least about 10, and typically a length of less than about 5 cm.

In one execution of the present invention, "short fiber" refers wood, such as eucalyptus, or acacia, or northern or southern softwood pulp fibers, such as chemical pulps, such as Kraft, sulfite, and sulfate pulps, as well as mechanical pulps including, for example, ground wood, thermomechanical pulp and chemically modified thermomechanical pulp. Also applicable to the present invention are fibers derived from recycled paper, which may contain any or all of the above categories as well as other non-fibrous materials such as fillers and adhesives used to facilitate the original papermaking. In addition to the various wood pulp fibers, other cellulosic fibers such as cotton linters, rayon, lyocell and bagasse can be used in this invention.

"Coforming" and/or "coforming process" as used herein means a process by which two or more separate materials are commingled. In one example, coforming comprises a process by which one or more and/or two or more first materials, for example filaments, such as polymer filaments, are commingled with one or more and/or two or more second materials, for example particulate materials, such as fibers, for example pulp fibers, or particles. In coforming processes two or more separate materials are commingled together to form a mixture, though not necessarily a homogeneous mixture, of the two or more materials. For example, in a coforming process filaments can be commingled with fibers to form a mixture of filaments and fibers that can be collected to form a fibrous structure according to the present invention.

"Fibrous structure" as used herein means a structure that comprises one or more filamentary materials and/or one or more particulate material(s). In one example, a fibrous structure according to the present invention means an orderly arrangement of filaments or fibers and particles within a structure in order to perform a function. The fibrous structures of the present invention may be homogeneous but preferably comprise z-directionally distinct regions, that may exhibit sharp boundaries, i.e. be layered, or gradual transitioning from one region to a neighboring region. If regioned or layered, the fibrous structures may comprise at least two and/or at least three and/or at least four and/or at least five regions or layers.

A "stream of material" as used herein relates to materials moving generally along common trajectories, with materials such as particulate material, such as short fibers or particles, filaments—as being molten material, especially polymeric material, solidifying material, or solidified material, fibers, such as broken or continuous solidified filaments. Streams may be essentially parallel, divergent or convergent according to their trajectories.

Within the present context, the term "die block" refers to an element of a multi-row CA-meltblowing system, to which molten polymer is supplied and wherein polymeric filaments are formed by pressing the polymer through capillaries of a plurality of nozzles. A die block typically comprises
- a spinneret block comprising
  - an upper plate,
    - whereby the term "upper" typically means "molten polymer supply side",
  - a lower plate,
- a plurality of nozzles,
  - that may be unitary with the spinneret block or removable,
  - and that form an array of rows and columns of nozzles;
- an air distribution plate;
- an exterior air plate;
- and a cover strip and securing means.

The multi row CA-meltblowing system may comprise further elements, such as supply means for the polymer and for curtain air for shrouding the array of nozzles, or temperature control means for the polymer and air.

The articles "a" and "an" when used herein, for example "a fiber", is understood to mean one or more of the material that is claimed or described.

All percentages and ratios are calculated by weight unless otherwise indicated.

When referring to a schematic, cross-sectional view of FIG. 1 for explanatory, but not limiting purposes, the present invention is in a first aspect an apparatus 1000 for forming a commingled web 1900 which comprises a forming box 1100. A particulate material 1400 is provided by a particulate material supply system 1410, and a first polymeric material 1200 and a second polymeric material 1300 are provided from a first (1210) and a second (1310) polymer supply system to a first (1220) and a second (1320) polymeric filament forming system. The materials are supplied to the particular material inlet 1114, and first and second polymeric material inlet 1112, 1113, respectively, of the forming box 1100.

Aided by vacuum of the suction box 1700, the commingled material exits the forming box at forming box outlet 1119 as commingled web 1900 laid onto a collector 1600, such as a moving screen.

The apparatus has a general three-dimensional extension, exhibiting an apparatus height direction 1005, corresponding to the thickness or z-direction of a web as produced thereon.

It further exhibits a machine- or x-direction 1002, and a cross- or y-direction (indicated by the "x" representing the fletching of a direction arrow 1008). Thus, FIG. 1 depicts a z-x-directional cross-sectional view, wherein the left part, as seen by a viewer, depicts the upstream part 1001, whilst the right part with the commingled web 1900 on the collector 1600 depicts the downstream part 1009, as the collector is adapted to move from the upstream to the downstream part, thereby collecting the commingled web at an increasing web height, reaching the final web height or caliper. Cross-directionally, the apparatus is horizontally aligned and has an extension as may be less than 1 m, but often is more than 1 m, for large scale production apparatuses more than 3 m or even more than 5 m, though typically not exceeding 10 m. The apparatus may comprise cross-directionally several sub-units or be unitary over its full width. Whilst the first may allow easier handling, such as for setting the system up, cleaning, repairing, or changing certain parts, e.g. to adjust for different number of nozzles, the second avoids cross-directional discontinuities in the web. The web forming apparatus may be a stand-alone, separate, discrete, modular device that can be inserted as such into a larger manufacturing machine, such as an absorbent article or wipe making machine, and/or it may be a fully integrated component of such a larger machine.

A forming box 1100 as suitable for the present invention comprises a housing, an enclosed or partially-enclosed forming chamber 1110 formed by one or more walls through which one or more materials pass through inlets or outlets. A forming box may be made from a wide variety of materials, such as metal, often steel, but also sufficiently stiff polymeric material, such as polycarbonate, or even glass.

The material inlets of the forming box are connected to the respective material supply systems and arranged such that a $1^{st}$ polymeric filament inlet 1112 is positioned upstream of the particulate material inlet 1114, which is positioned upstream of the $2^{nd}$ polymeric filament inlet 1113.

In a particular preferred execution, the particulate material inlet may be positioned such that the particulate material is streaming through the forming chamber 1110 generally along gravity towards the collector, though some tilting versus the vertical is acceptable.

The particular material inlet 1114 may exhibit a MD directional extension of more than about 0.07 cm, or more than about 0.1 cm, or more than about 0.1 cm, or more than about 0.3 cm and/or less than about 25 cm, or less than about 12.5 cm or less than about 7.5 cm. The $1^{st}$ and the $2^{nd}$ polymeric filament inlet 1112 and 1113 are preferably positioned tilted to the vertical at between 30° and 90°, preferably at 60°, and optionally though not necessarily symmetrical, and are adapted to allowing the expelled filaments to entangle the downward streaming particulate material prior to contacting the collector mean's surface.

The polymeric filament inlets 1112 respectively 1113 may exhibit a MD directional extension of more than about 0.25 cm, more than 1.25 cm or more than about 2.5 cm, and/or of less than about 40 cm, or less than about 25 cm, or less than about 15 cm.

The commingled materials exit the forming chamber via the forming chamber outlet 1119, positioned towards the collector, such as a moving belt 1600, further supported by vacuum suction by suction box 1700.

The forming chamber outlet my exhibit a MD extension of more than about 0.25 cm, or more than about 1.25 cm, or more than about 2.5 cm, and/or less than about 75 cm, or less than about 50 cm, or less than about 30 cm.

A particularly preferred execution of a forming box is described in more detail in the above cited US2016335950, to which express reference is made with regard to design, in particular dimensions, and operation of the forming box.

Whilst for ease of explanation the particulate material inlet as well as the filament inlets are described in singular, multiple executions of any of these may well be contemplated and executed by using ordinary skills.

Particulate material 1400 is delivered to the particular material inlet 1114 of the forming box 1100. To this end, particulate material is provided as a bulk material, or—e.g. in case of short fiber materials—may be delivered in roll or bale form that may then be disintegrated into individualized fibers by conventional means such as hammer mill and/or solid additive spreader and/or airlaying equipment such as a forming head, for example a forming head from Dan-Web Machinery A/S. In a particular execution when aiming at a high homogeneity of the resulting web, the apparatus may comprise or be connected to a cross-directionally spatially controllable eductor that is capable of being manipulated during operation to control pressure, velocity, mass, and/or flow CD profiles of particulate material, such as short fibers, when suspended in a fluid medium. A particular execution of such an eductor is disclosed in US2016/354736, to which express reference is made, as far as it relates to the specific disclosure for such an eductor and its operation.

The particulate material may be supplied to the inlet 1114 of the forming box by gravity, or by pneumatic transport, or other mechanical feeder or a combination thereof. Further, the apparatus comprises at least two multi-row CA-meltblowing systems 1220 and 1320, respectively, that may be connected to a common or (as indicated in FIG. 1) to separate polymers supply systems 1210, 1310 supplying suitable polymers 1200, 1300 to CA-meltblowing dies or die blocks, which are connected to the respective filament inlet 1112, 1113 of the forming box 1100.

Within the present context the term "connected" refers to a positioning such that the filaments as released by the CA-meltblowing systems are directly streaming into the forming chamber 1110 of the forming box 1100.

As described in more detail herein below, the multi-row CA-meltblowing systems are according to the general teaching of U.S.'616 or U.S.'334 (Biax), i.e. a multiplicity of nozzles is arranged in an array of rows and columns and expel filaments into the forming chamber 1110.

The orientation of the system is as described for the polymer inlet in the above, whereby the nozzles define the orientation of the die of the system with a die block centerline parallel to nozzles.

For the operation, the nozzles are adapted to expel filaments through nozzle orifices predominantly along the nozzle centerline, which, as indicated in FIG. 1, is inclined versus the particulate material inlet, here shown as the vertical, such that the die block centerlines intercept the trajectories of the particulate material steam (see below). Towards the machine directional limits of the array of nozzles, the direction of the filaments may deviate outwardly. Express reference is made to the cited U.S.'616 with regard to further design and operation details, whilst U.S.'334 describes more details to the optional use of a shrouding air curtain around the nozzle array.

It is a particular element of the present invention that the polymer supply systems, respectively the die blocks thereof, comprise sub-arrays of nozzles that are adapted to form pluralities of filaments that exhibit different properties.

The array of nozzles may comprise at least two sub-arrays that are distinct in the geometry of the nozzles, i.e. inner or outer diameter or nozzle length. Optionally, the capillaries of the nozzles of sub-arrays may also exhibit differing cross-sectional shape, e.g. non-circular shapes like star-shaped or bi- or multi-lobal shapes.

A first option of this approach is described in more detail in WO2020/099193 (filed as PCT/EP2019/080293, TKWM), to which express reference is made as to the design and operation of a die block comprising a unitary spinneret block with two sub-arrays of nozzles.

As shown in FIG. 2A, a spinneret block 152 as may be part of a die block (not shown) or of any of the polymeric filament forming systems 1220 or 1320 comprises a spinneret body 153, which is unitary with nozzles, of which one column with five nozzles 158 is shown, each representing one cross-directionally extending row and together forming an array of nozzles 1225, 1325. As shown, the nozzles are oriented vertically along gravity (1005). However, the orientation of the system as connected to the forming box is such that the orientation of the nozzles is inclined relative to gravity, see FIG. 1, and the skilled person will readily adapt relative positioning terms like "above" or "below" accordingly. FIG. 2A further depicts a polymer supply cavity 130 to provide molten polymer to the nozzles, as well as an air supply passage 132 to provide air for shrouding each of the filaments, and holes for connecting the parts of the die block 199.

The array of nozzles 1225 comprises sub-arrays 1222, 1322 and 1228, 1328, respectively. Such a sub-array may include at least one row of nozzles, preferably, though not necessarily extending over the full width of a die block. In a particular execution, and as indicated in FIG. 2A, the nozzles 158' of sub-array 1222, 1322 differ substantially from nozzles 158" of sub-array 1228, 1328 in at least one of the dimensions selected from the group consisting of inner diameter of the nozzle, outer diameter of the nozzle, and length of the nozzle, here indicated by differing inner nozzle or capillary diameter 157' and 157". Within the present context, the term "substantially different" refers to a difference in the respective dimension of at least 5%, often more than 10% thereof.

In a second option of this approach, the die blocks comprise a spinneret block with removable nozzles, as described in more detail in WO2020/104190 (filed as PCT/EP2019/080291, TKWM), to which express reference is made with regards to the design of the removable nozzles.

Figure 2B:
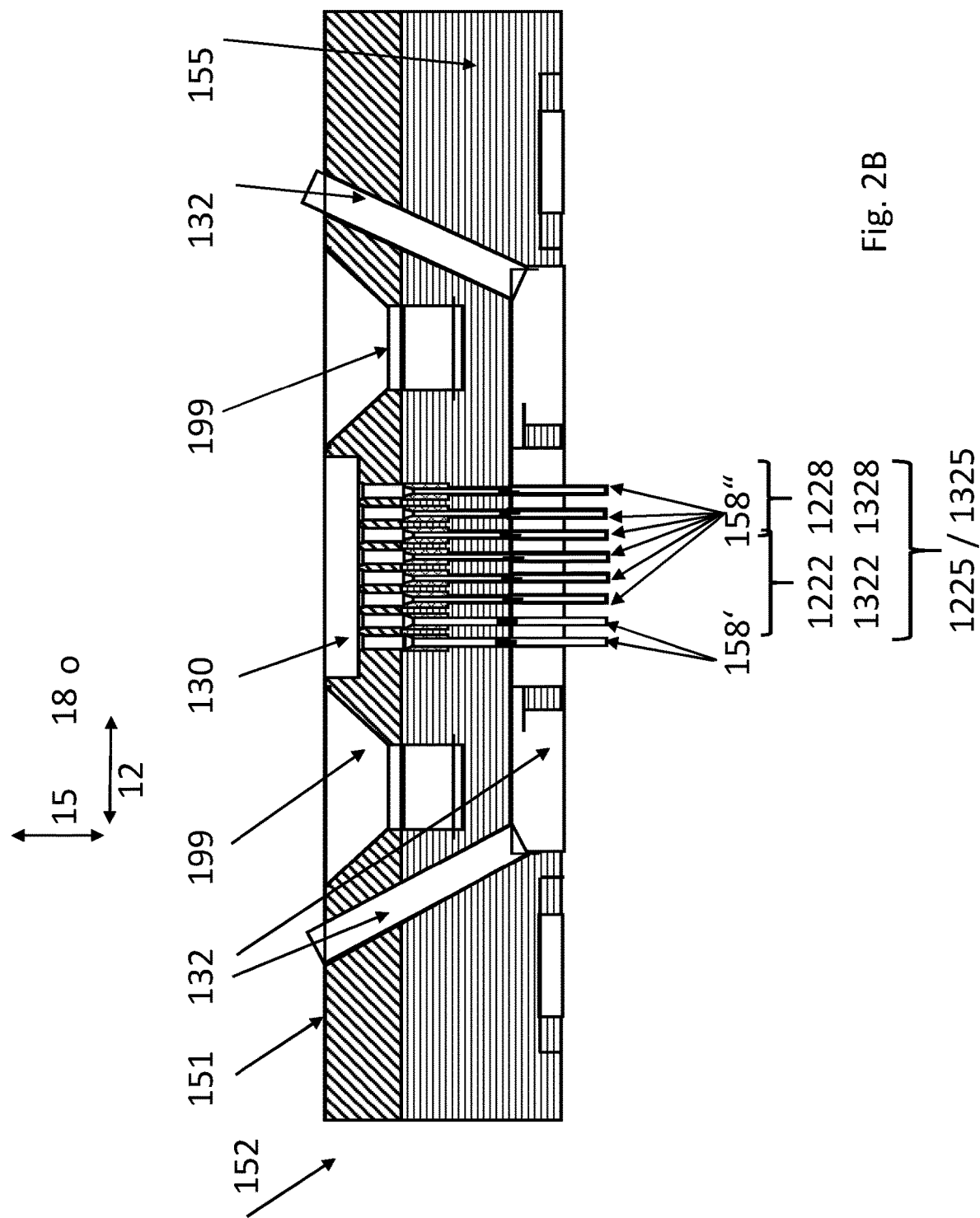
FIGS. 2A and B depict particular executions according to the present invention.

Referring to FIG. 2B, a first execution of a spinneret block 152 for a polymeric filament forming system 1220, 1320 comprising a spinneret body with an upper (151) and a lower (155) plate and nozzles 158 positioned removably through holes of the lower plate, of which one column with eight nozzles 158 is shown, each representing one cross-directionally extending row and together forming an array of nozzles 1225, 1325. As shown, the nozzles are oriented vertically along gravity (1005). However, the orientation of the system as connected to the forming box is such that the orientation of the nozzles is inclined relative to gravity, see FIG. 1, and the skilled person will readily adapt relative positioning terms like "above" or "below" accordingly. As indicated in FIG. 1, the inclination of the two polymer filament forming systems 1220 and 1320 can be symmetric to the vertical or the particle infeed, however, this not necessarily the case. FIG. 2B further depicts a polymer supply cavity 130 to provide molten polymer to the nozzles, as well as an air supply passage 132 to provide air for shrouding each of the filaments, and holes for connecting the parts of the die block 199.

The array of nozzles 1225, 1325 comprises sub-arrays 1222, 1322 and 1228, 1328, respectively. Such a sub-array may include at least one row of nozzles, preferably, though not necessarily extending over the full width of a die block. In a particular execution, and as indicated in FIG. 2A, the nozzles 158' of sub-array 1222, 1322 differ substantially from nozzles 158" of sub-array 1228, 1328 in at least one of the dimensions selected from the group consisting of inner diameter of the nozzle, outer diameter of the nozzle, and length of the nozzle, here indicated by differing inner nozzle or capillary diameter 157' and 157". Within the present context, the term "substantially different" refers to a difference in the respective dimension of at least 5%, often more than 10% thereof.

Another approach towards providing filaments with different properties includes connecting the nozzles of sub-arrays to separate polymer supply systems.

Figure 3A:
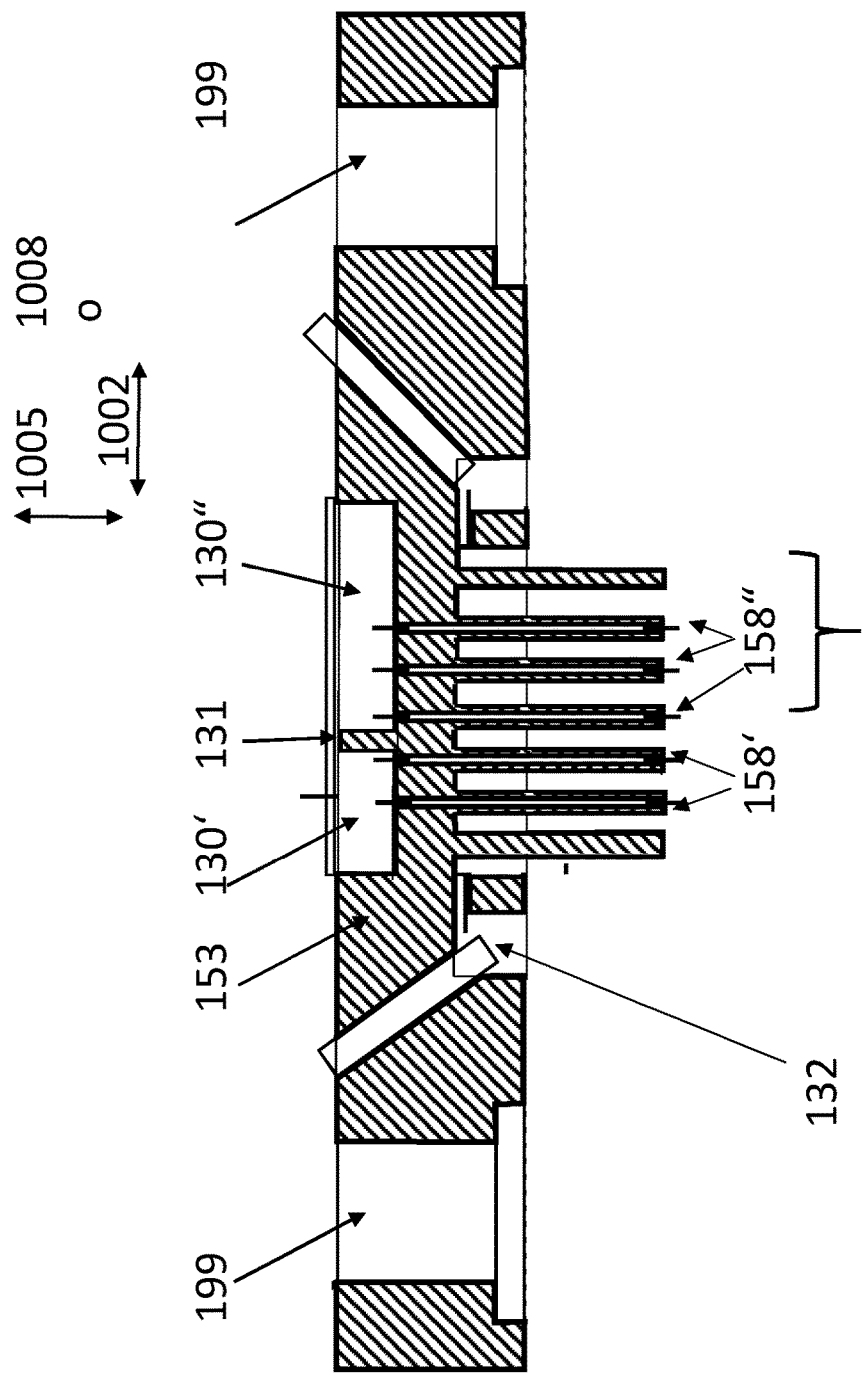
FIGS. 3A and B depict particular executions according to the present invention.

In a first option to this approach, reference is also made to the above cited WO2020/099193, as far as the use of different polymers is made, and FIG. 3A wherein in a similar set up as in FIG. 2A the cavity 130 for the polymer supply is dived into sub-chambers 130' and 130" by separation means 131, which feed the nozzles of the respective sub-arrays 1222, 1322 and 1228, 1328, respectively, with different types of polymers, whereby the polymers differ in at least one of qualitative features as polymer type, or quantitative parameters such as polymer flow rate, polymer pressure, thereby differing by at least 5%, often more than 10%, based on the respective smaller values, or polymer temperature, thereby differing by at least 5° C. Optionally, the nozzles may be executed with co-axially positioned sub-capillaries so as to create bi- or multi-component fibers, wherein such sub-capillaries are fed with different, respectively immiscible polymer types.

For any of these variants, the nozzles are preferably executed such that a smooth flow of the molten polymer is enhanced by chamfering the inlet portions of the nozzles. For executions with removable nozzles, the spinneret block may be executed with chamferings being positioned in grooves, that may be filled with a sealing means to selectively exclude certain rows of the die head, as more described in the referenced applications, to which express reference is made as far as the nozzle designs are concerned.

In a second option of this approach, reference is also made to the above cited WO2020/104190, as far as the use of different polymers is made.

Figure 3B:
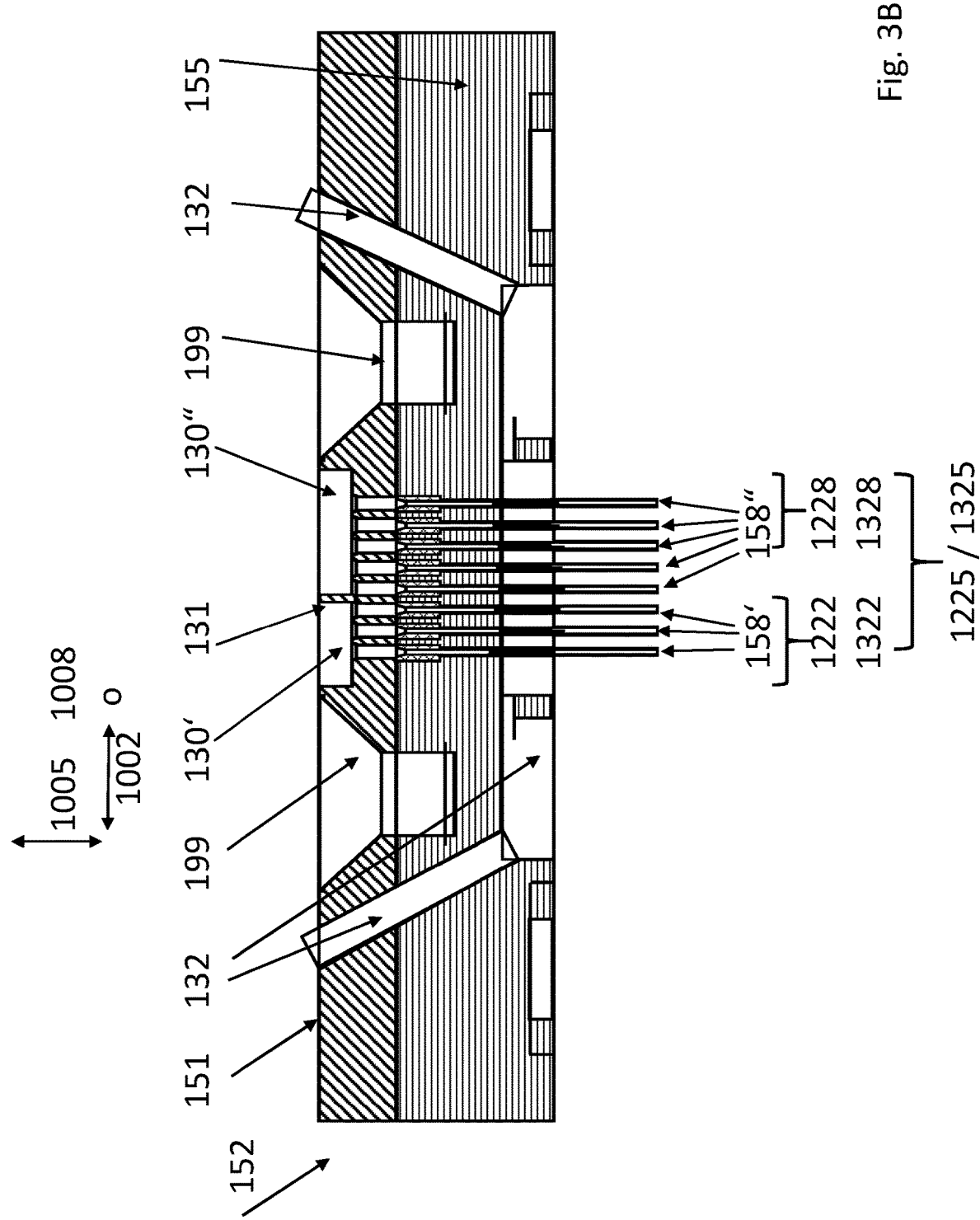

As shown in FIG. 3B, depicting a similar set up of the spinneret bock 152 as in FIG. 2B, the nozzles 158' of one sub-array 1222, 1322 may be connected to a first, separate polymer supply system via a first molten polymer supply cavity 130' separated from a second polymer supply cavity 130" by separation means 131, and adapted to supply a first type of molten polymer to the first sub-array 1222, 1322 differing from the molten polymer supplied to a different sub-array 1228, 1328 via a second molten polymer supply cavity 130" and then to nozzles 158", whereby the polymers differ in at least one of qualitative features as polymer type, or quantitative parameters such as polymer flow rate, polymer pressure, thereby differing by at least 5%, often more than 10%, based on the respective smaller values, or polymer temperature, thereby differing by at least 5° C. Optionally, the nozzles may be executed with co-axially positioned sub-capillaries so as to create bi- or multi-component fibers, wherein such sub-capillaries are supplied with different, respectively immiscible polymer types.

Yet a further option for inducing different filament properties from different nozzles is to solely apply different settings to different quenching devices, as described below in the process description.

Referring again to FIG. 1, the apparatus 1000 further comprises a quenching system comprising quenching devices 1510, 1520, 1530, 1540, positioned adjacent to the polymeric filament inlets 1112, 1113 for providing quenching fluid(s) at least to the filaments of the outer nozzles of the nozzle array exiting from the filament forming systems 1220, 1320. Quenching aims at controlling the solidifying and crystallization of the polymer filaments just after these leave the filament forming nozzle, and thus web properties such as shot formation, hand, stretchability, and tear strength. Quenching also impacts the web properties, e.g. by interfiber fusion and also fiber entanglement.

The quenching fluid may be gaseous, such as air or steam, or liquid, such as water spray, or combinations thereof. The impact of quenching depends on e.g. the quenching fluid properties, such as temperature respectively evaporation energy potential (enthalpy) in case of the quenching fluid comprising liquid, such as water, quenching fluid stream direction and velocity, and the amount of quenching fluid relative to the amount of filaments to be contacted. Typically, the quenching fluid is provided at a temperature lower than the temperature of the filaments when leaving the nozzles.

In contrast to conventional quenching systems without a forming box, wherein ambient air is entrained from the environment by the movement of the stream of filaments, the preferred execution provides a fluid medium with controlled properties, such as conditioned air, or water spray.

In a particularly preferred execution of the present invention, quenching system is adapted to selectively control the separate quenching devices. This is of particular relevance for the execution with nozzle sub-arrays for which filaments may exhibit differing filament properties on the respective upstream and downstream portion of the die. The separate control means for the quenching devices now can be impacted and adjusted, such as by being adapted to control type of quenching fluid, e.g. air, steam, water spray;
temperature respectively energy content of the fluid;
amount of the quenching fluid stream, as may be expressed
  as mass flow rate, expressed in mass per time,
  or as the momentum, expressed in e.g. [kg*m/sec],
  or mass flux, expressed in [kg/(m$^2$*sec)];
velocity of the quenching fluid stream when exiting the quenching device, typically expressed in meter per seconds;
direction of the quenching fluid stream relative to the direction of the neighboring filament streams;

Whilst the present equipment has been described by referring to an apparatus comprising a single particulate material supply system and two polymeric filament forming systems, the skilled person will readily realize that there may be more of these, optionally also including a higher number of quenching devices. Further the housing may have additional openings to accommodate other additives, additional quenching devices, etc.

The web forming apparatus may optionally comprise additional web forming elements so as to apply a filamentary layer or scrim on one or both surfaces of the web. Preferably, a polymeric filament forming system is adapted to form filaments in situ by melt extrusion, e.g. spun-bonding, melt-blowing or CA-meltblowing, as well known in the art. More preferably, the polymeric filament forming system is of the CA-meltblowing type, according to the above referenced U.S.'616 or U.S.'334, or WO2020/099193, or WO2020/080291, all of which are expressly referred to as far as the filament extruding equipment are concerned. It is also within the scope of the present invention that such web forming elements comprise a multi-row CA-meltblowing system with subarrays of nozzles for releasing filaments with differing properties as described hereinabove in the context of the forming of filaments inside the forming box.

Figure 6:
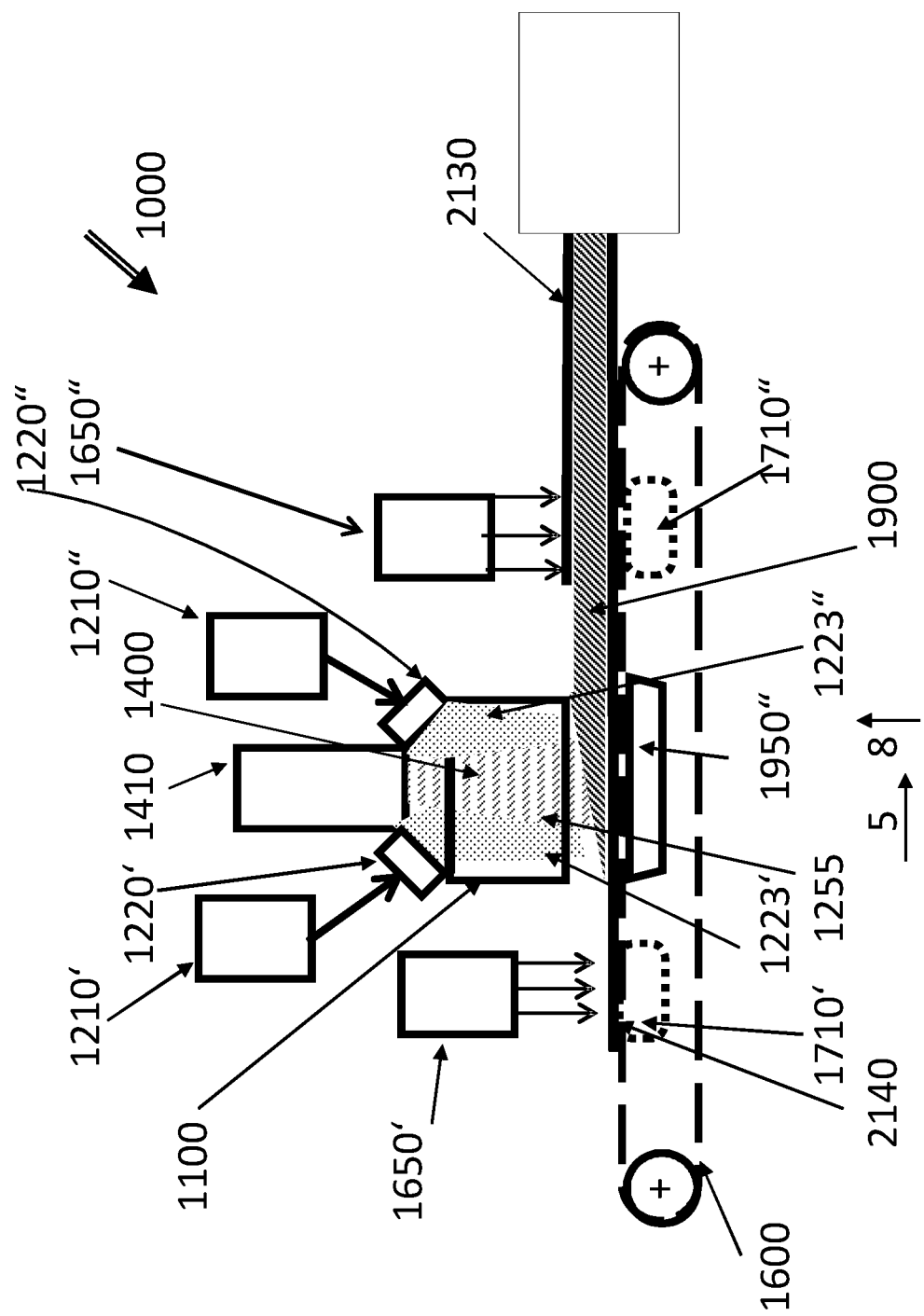
FIG. 6 depicts a further execution of an equipment according to the present invention.

By referring to an exemplary, though not limiting execution as depicted in FIG. 6, a first polymeric scrim filament forming system 1650' is positioned upstream of the forming chamber 1100, as described in the above and shown in FIG. 1, adapted to deposit a first scrim 2140 on a collector belt 1600, preferably supported by a suction box 1710'. Onto this scrim, the commingled web 1900 is formed as described in the above. Downstream of the forming box 1100 a second polymeric scrim filament forming system 1650" may be positioned, adapted to deposit a second scrim 2130 onto the commingled web 1900, preferably supported by suction box 1710".

Optionally, one or both of the scrim layer(s) may be applied as preformed webs, such as spunbonded webs, preferably of low basis weight of less than about 10 g/m² or less than about 5 g/m².

The collector 1600 onto which the commingled web and/or scrim layer(s), are deposited may be any air permeable device, such as a wire belt. Optionally, it may exhibit a particular x-y-directional pattern with z-directionally raised or deepened portions, adapted to impart a pattern or texturing in the structures as laid thereon. Such collectors are described e.g. in US2017/0165720A1, or US20170022660A1, to which express reference is made as to such collectors, their operation, and the resulting properties of the webs deposited thereon.

Optionally, the commingled web, as may comprise one or two scrim layer(s) may be further treated such as by particular embossing, also referred to as print embossing, such as described in U.S. Pat. No. 9,714,484B2 or US20150086760A1, to which express reference is made as far as the bonding pattern, especially the bonding area percentage, is concerned.

Further, a liquid treatment unit may be positioned after the web forming steps, such as to form a wet wipe. The final web, optionally comprising liquid, may be treated in one or more finishing units, such as units for rolling, winding, partial or complete separating, folding, or packaging. The present invention allows hitherto unknown operation for achieving properties of a commingled web by allowing to adjust a multitude of process parameter, especially by allowing to control the process conditions for the sub-arrays and the quenching devices, if present, independently.

Figure 4:
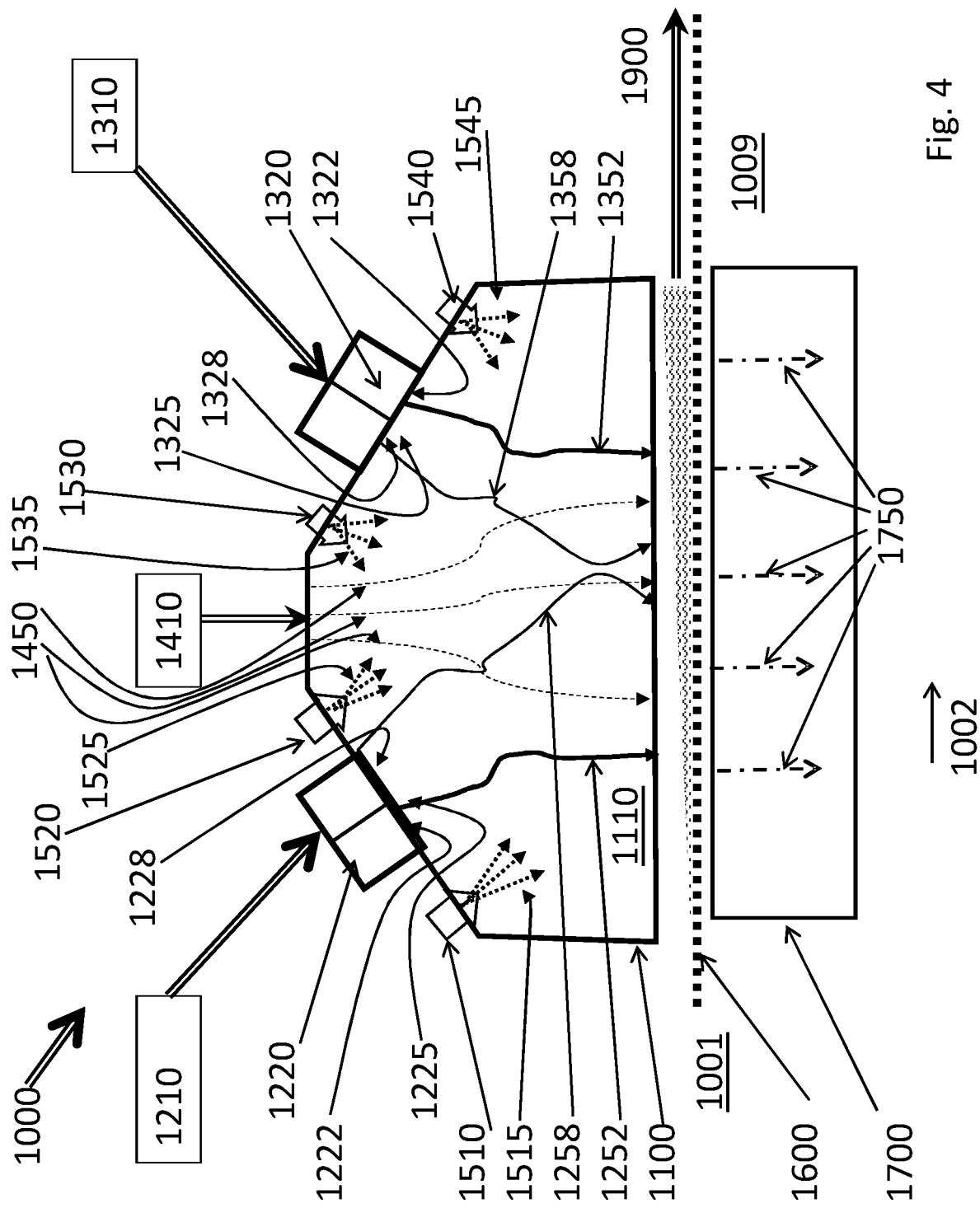
FIG. 4 depicts the flow paths or trajectories during operation of a process according to the present invention.

In referring to FIG. 4, depicting schematically the equipment as described in the above and in FIG. 1, material stream trajectories are schematically depicted. Generally, the trajectories of all materials are impacted by gravity, material properties (density, dimensions), flow characteristics (speed, direction) of the respective material but also of the other materials, especially if streams are merging, and materials are commingling. Within the present context, the term "trajectories" refers to the flow paths of certain materials, which may—and typically will—present a different path for each of the elements of the material, i.e. each particle, fiber, filament, droplet, or fluid element. However, in the following explanation, "trajectories" will be considered to represent exemplarily certain paths of the elements, from the material entering the forming box at the respective inlet towards forming box outlet 1119 and the collector 1600.

The particulate material as entering the forming box at particulate material inlet 1114 is moving along particulate material stream trajectories 1450 (indicated by thin dashed lines) towards the collector 1600. The velocity of the particulate material stream may vary from as low as essentially only accelerated by gravity, e.g. for particles falling freely into the forming box, to the velocity of a carrier fluid, e.g. when particles of fibers are pneumatically transported from the respective supply.

The polymeric filaments as may be formed according to the teaching of U.S.'616 or U.S.'334 in combination with the particular embodiments of the equipment as described in the above, or by including the teaching of the above cited GB2005832.7 (unpublished, TKWM).

The filament trajectories 1252, 1352, (thick solid lines), 1258, 1358 (thin solid lines), depend on from which part a particular filament is released, e.g. from which of the sub-arrays 1222, 1228, 1322, 1328, on the properties of the filament, e.g. size, composition, etc. as described in the above, the velocity at which the filaments are expelled from the nozzles, but also from the positioning of the releasing nozzle within a sub-array.

It should be noted that the filaments, when exiting from the nozzles, are essentially continuous and preferably remain continuous, but a certain break up into polymeric fibers of certain length or even into droplets may occur upon their path to the collector means. However, in the presentation in FIG. 2, the trajectories of continuous filaments and resulting polymeric fibers or droplets are considered the same.

The quenching fluid trajectories 1515, 1525, 1235, 1545 depend primarily on the positioning of the respective quenching fluid inlet 1512, 1522, 1532, 1542, the type of quenching fluid, the quenching fluid stream orientation and velocity. Thus, overall the trajectories of all material streams impact the trajectories of all other materials, thereby providing the commingling of the material. Most of the commingling will occur prior to the deposition on the collector 1600, though some additional commingling may occur there. The above mentioned parameter for impacting the trajectories of each of the material streams allow a very precise control of commingling and the resulting web characteristics over a wide range. Referring to FIG. 2 again, a particular set up is described for explanatory, but not limiting purposes only.

First, the trajectory 1252 of the filaments and fibers as released from the $1^{st}$ sub-array 1222 of the first die block 1220 is not crossing with a trajectory of the particulate material, thus providing a particulate material free layer on the collector.

As exemplarily indicated in FIG. 2, the trajectories of the particulate material 1450 are crossing with the trajectories of the filaments or fibers as released from the second sub-arrays 1228, 1328 of the first and second die block 1220 and 1230, respectively.

Finally, the trajectory 1352 of the filaments and fibers as released from the first sub-array 1322 of the second die block 1320 is not crossing with a trajectory of the particulate material, thus providing a particulate material free layer on top of the central layer.

Thus, a structure can be formed, which exhibits particle free surfaces and a center layer with commingled fibers and particulate material, whereby the fibers of the surface exhibit a different size, e.g. a finer diameter, than the fibers in the center layer.

Further, the adjustment of the quenching fluids as well as of the balancing of the material streams and the suction 1750 of the suction box 1700 allows even more options for engineering the resulting materials.

In a particular example, the adjustment of the $2^{nd}$ and $3^{rd}$ quenching devices may be such that they impact the filaments and fibers as released from the second sub-arrays of the first and second die block, respectively, differently as a function the rows of the filament releasing nozzles being closer towards the quenching device or more inside. This may actually provide a gradual change of conditions, such as temperature or flow speed and direction, for the filaments 1258, and 1538, respectively, resulting in a commingled web with a gradient of properties across its thickness or z-direction.

Optionally a pattern or texturing of the web may be imparted by employing an air permeable collector, onto which the commingled web and/or scrim layer(s) are deposited, which exhibits a particular x-y-directional pattern with z-directionally raised or deepened portions. Such collectors are described e.g. in US2017/0165720A1, or US20170022660A1, to which express reference is made as to such collectors, their operation, and the resulting properties of the webs deposited thereon.

Optionally, scrim layers may be formed by polymeric scrim filament forming systems, as described in the above, as may be operated as conventional and well known systems like spunbonding systems for providing essentially endless relatively thick fibers, melt-blowing systems for providing broken fine fibers, or CA-meltblowing systems for providing fine but strong and essentially continuous filaments, optionally including the teaching of the present invention for the polymeric filament forming systems of the forming box.

Optionally, the commingled web, as may comprise one or two scrim layer(s) may be further treated such as by applying particular embossing, also referred to as print embossing, such as described in U.S. Pat. No. 9,714,484B2 or US20150086760A1, to which express reference is made as far as operating the embossing unit.

After the web is formed, it may be submitted to further processing step to form pre-cursor or final articles for use, such as—without limitation—adding materials like binder, folding, or packaging, or applying tuft-generating operations, thermal bonding operations, ultrasonic bonding operations, perforating operations, surface treatment operations such as application of lotions, silicones and/or other materials and mixtures thereof.

The fibrous commingled webs as made on the described apparatus with the described process are exhibiting z-directionally several fibrous regions.

In one option, the fibrous structures of the present invention exhibit a pore volume distribution such that greater than 8% and/or at least 10% and/or at least 14% and/or at least 18% and/or at least 20% and/or at least 22% and/or at least 25% and/or at least 29% and/or at least 34% and/or at least 40% and/or at least 50% of the total pore volume present in the fibrous structures exists in pores of radii of from 2.5 μm to 50 μm as measured by the Pore Volume Distribution Test Method such as described in the above referenced US2016/355950 to which express reference is made her as to this Test Method.

Whilst the present invention can be used for the manufacturing of well-known materials it is a particular feature that the equipment and its operation allow the production of materials of new types with new properties.

In referring to FIG. 5, a z-directional cross-sectional view of an exemplary execution of a commingled web as may result from operating the equipment respectively the process according to the present invention is depicted with two CA-meltblown fibrous surface regions 2110, 2120, two inner regions with CA-meltblown fibers 2210, 2220, and a central region 2300 comprising particulate material.

Therein, at least in a sub-region of the inner regions the CA-meltblown fibers are substantially different from the CA-meltblown fibers of the surface regions. In this context, the term "substantially different" refers to a first plurality of fibers in a region exhibit a property different by at least 5% of the respective lower value from a second plurality of a neighboring region, whereby the difference in properties is one or more of the group consisting of fiber diameter;
fiber length;
fiber strength;
fiber composition:
type of polymer;
melt flow index or rate;
fiber structure
crimp;
cross-sectional composition.

The total commingled web may exhibit a total commingled web basis weight of more than about 10 $g/m^2$, or more than about 15 $g/m^2$, or more than about 30 $g/m^2$, or more than about 40 $g/m^2$, or more than about 60 $g/m^2$, or more than about 100 $g/m^2$ or even more than about 150 $g/m^2$, and/or less than about 500 $g/m^2$, or less than about 300 $g/m^2$, or less than about 150 $g/m^2$, or more than about 100 $g/m^2$.

Each of the surface regions which are essentially free of particulate material may exhibit a surface region basis weight of more than about 0.5 $g/m^2$, or more than about 1 $g/m^2$ or more than about 2 $g/m^2$, and/or less than about 20 $g/m^2$, or less than about 10 $g/m^2$, or less than about 5 $g/m^2$.

The particulate material may represent a particulate material basis weight of more than about 10 $g/m^2$, or more than about 20 $g/m^2$, or more than about 40 $g/m^2$, or more than about 60 $g/m^2$, or more than about 100 $g/m^2$, or more than about 150 $g/m^2$, or more than about 300 $g/m^2$, and/or less than about 300 $g/m^2$, or less than about 150 $g/m^2$, or less than about 100 $g/m^2$, or less than about 50 $g/m^2$, or less than about 30 $g/m^2$.

The particular material may represent a particulate material weight percentage of more than about 50%, or more than about 70%, or more than 85% or even more than about 90% or more than about 95% bases on the total weight of the commingled web, including the scrim layers, if present.

In contrast to webs formed by conventional technologies, the present invention allows to create a more gradual transition from one region to the neighboring region—or even that the inner regions 2210, 2220 may overlap in the central region 2300.

In contrast to many prior art multi-layer executions that exhibit a relatively clear separation of the respective sub-layer, the process and equipment as described in the above allows to provide commingled webs with a gradual transition from one sub-region to the next. The gradually changing properties may be fiber properties such as fiber type, diameter, crimp, that may—in addition to other parameter—impact web properties such as local pore volume distribution or local composition, wherein the term "local" may refer to a volume of at least three times the average pore volume the total structure.

In addition to the layered structure of the commingled structure, the web may further comprise scrim layers of polymeric filaments, as may comprise polymers as described in the above to be suitable for forming the filaments of the commingled layer. In a preferred execution one or both of the scrim layers exhibit a basis weight of less than about 10 $g/m^2$ or less than about 5 $g/m^2$, or less than about 3 $g/m^2$, but typically more than about 0.1 $g/m^2$. In particular options, the commingled web or the commingled web with scrim(s) may exhibit a liquid Absorptive Capacity of greater than 12 g/g, when measured according to the Liquid Absorbent Capacity Test Method as described in US20150086659A1, to which express reference is made for this particular test method.

In particular, and often preferred options, the commingled web with scrim(s) may be combined with liquids to form a wet wipe, whereby such liquids may be aqueous, or oil based, or emulsions or lotions. The liquids may comprise one or more optional ingredients, such as emulsifiers, film-formers, skin treatment actives, preservatives, pH buffers, anti-oxidants, metal sequestrants, particulates, polymeric opacifiers, opacifying minerals, perfumes and various other adjunct ingredients, such as described in U.S. Pat. Nos. 7,666,827; 7,005,557; 8,221,774; and U.S. Patent Application Publication No. 2011/0268777.

In particular options, the commingled web or the commingled web with scrim(s) may exhibit a soil leak through Value of less than 8.5 as measured according to the Soil Leak Through Test Method as described in U.S. Pat. No. 9,631,321B2, to which express reference is made here for this particular test method.

In particular options wherein the liquid composition comprises a lotion composition, the wet wipe with such a lotion may exhibit a Lotion Release of greater than 0.25 as measured according to the Lotion Release Test Method, as described in U.S. Pat. No. 9,631,321B2, to which express reference is made here for this particular test method.

In particular options, the commingled web or the commingled web with scrim(s) may comprise a liquid composition and exhibit Tactile Sensory Coefficient of Friction of less than 0.60 as measured according to the Tactile Sensory Coefficient of Friction Test Method described in US20150086659A1.

The webs according to the present invention or webs as made on the equipment or according to the process of the present invention can be used as or in articles for personal, surface or food cleaning, but also as liquid absorbent or adsorbent articles, or as filter media. Particular uses include paper towels, bath tissue, facial tissue, napkins, baby wipes, adult wipes, wet wipes, cleaning wipes, polishing wipes, cosmetic wipes, car care wipes, wipes that comprise an active agent for performing a particular function, cleaning substrates for use with implements and mixtures thereof.

The webs are particularly suited for being used in "sanitary tissue product" as used herein means a soft, typically low density (i.e. less than about 0.15 g/cm3) web useful as a wiping implement for post-urinary and post-bowel movement cleaning (toilet tissue), for orthohinolaryngological discharges (facial tissue), and in particular for multi-functional absorbent and cleaning uses (absorbent towels).

The term "wipe", as used herein, refers to an article comprising a sheet of fibrous material. Wipes are also known to as "cleaning sheet". Wipes, either dry or wet, are intended to be used for removal of a substance from a surface or object which is animate or inanimate, or alternatively, application of a material to a surface or object which is animate or inanimate. For instance, wipes may be used for cleaning hard surfaces, such as floors. Wipes may also be used for human or animal cleansing or wiping such as anal cleansing, perineal cleansing, genital cleansing, and face and hand cleansing. Wipes may also be used for application of substances to the body, including but not limited to application of make-up, skin conditioners, ointments, and medications. They may also be used for cleaning or grooming of pets. Additionally, they may be used for general cleansing of surfaces and objects, such as household kitchen and bathroom surfaces, eyeglasses, exercise and athletic equipment, automotive surfaces, and the like. In the present disclosure, a wipe may be a cleaning sheet for human cleaning. The wipe may be a wipe and comprise a lotion. The wipe may be a wet wipe.

The skilled person will realize that the present description focuses on several embodiments that may be employed alone or in combination with one another. In particular, the various options may also be combined, unless expressly described as "alternative" or "first and second" options.

For example, explaining the principle by referring to varying filament thicknesses (see FIG. 2) does not mean that the principle cannot be employed to filaments exhibiting different polymer type or properties or both.

The invention claimed is:

1. A web forming apparatus configured to form a commingled web including
particulate material, and
synthetic fibers of a coaxial multi-row meltblown (CA-meltblown) type, said apparatus comprising:
a particulate material supply system oriented to deliver a vertically downwardly moving stream of the particulate material;
at least one polymer supply system configured to provide polymer material;
first and a second multi-row coaxial (CA)-meltblowing systems to receive the polymer material, wherein each of said first and second multi-row CA-meltblowing systems is configured to form CA-meltblown fibers and comprises an array of polymer releasing orifices comprising at least two cross-directionally extending rows of polymer releasing orifices,
a forming box configured to form commingled material comprising said particulate material and the CA-meltblown fibers, wherein the commingled material includes commingled short fibers and the CA-meltblown fibers, said forming box comprising
a particulate material inlet connected to said particulate material supply system,
two CA-meltblown fiber inlets each connected to one of said first and second multi-row CA-meltblowing systems, and
a commingled material outlet,
a collector for collecting the commingled short fibers and the CA-meltblown fibers from said commingled fiber outlet of said forming box, and configured to move along a machine direction of the apparatus, wherein each one of said CA-meltblowing inlets of said forming box is positioned machine-directionally before ("upstream") and after ("downstream") the particulate material inlet,
wherein said arrays of polymer releasing orifices comprises at least a first and a second sub-array, each of the first and a second sub-arrays comprising at least one row of orifices,
whereby wherein the orifices of at least one of said first and second sub-arrays are configured to release fibers of different properties than the orifices of a different sub-array of the first and second sub-arrays, by one or more selected from the group consisting of
the orifices of said first and second sub-arrays exhibiting differing orifice diameters;
the orifices of said first and second sub-arrays are connected to polymer supply systems for differing polymer types;
the orifices of said first and second sub-arrays are connected to polymer supply systems for differing polymers throughput;

the orifices of said first and second sub-arrays are connected to polymer supply systems for differing polymer supply pressure; and the orifices of said first and second sub-arrays are connected to independent temperature control systems.

2. An apparatus according to claim 1, further comprising a quenching system comprising:

a first quenching device machine directionally positioned upstream of said first multi-row CA-meltblowing system;

a second quenching device machine directionally positioned between said first multi-row CA-meltblowing system and said particulate material inlet;

a third quenching device machine directionally positioned between said particulate material inlet and said second multi-row CA-meltblowing system;

a fourth quenching device machine directionally positioned downstream of said second multi-row CA-meltblowing system;

each of said first, second, third and fourth quenching devices being configured to release a first, second, third, and fourth quenching fluid stream, respectively, into said forming box; and said first, second, third and fourth quenching devices comprising quenching fluid stream control systems configured to control properties of at least one of said first, second, third, and fourth quenching fluid streams independently from at least one other of said first, second, third, and fourth quenching fluid streams, by control means of said quenching fluid stream control systems including one or more selected from the group consisting of connecting said first, second, third and fourth quenching devices to quenching fluids of different types:

quenching fluid temperature control means;

quenching fluid supply pressure adjustment means;

quenching fluid supply flow rate;

quenching fluid exit angle relative to CA-meltblowing head; and quenching fluid exit angle relative to particulate material delivery axis.

3. An apparatus according to claim 1, further comprising one or more of selected from the group consisting of removable nozzles;

a unitary die head comprising a spinneret block and nozzles;

variable die head angles relative to a die head axis; and

Bico-nozzles connected to separate polymer supply systems.

4. An apparatus according to claim 1, wherein said first and second sub-arrays of both CA-meltblowing systems include orifices exhibiting a larger diameter than orifices of respective other sub-arrays that are positioned machine directionally towards said particulate material inlet.

5. An apparatus according to claim 1, further comprising at least one web forming element positioned up-stream and/or downstream of said forming box and configured to extrude filaments and forming scrim layers on outer surfaces of said commingled web.

6. An apparatus according to claim 1, wherein said particulate material comprises pulp fibers as short fibers.

7. An apparatus according to claim 1, wherein said particulate material comprises superabsorbent particles as particles.

8. An apparatus according to claim 2, wherein quenching fluids of the first, second, third, and fourth fluid streams are selected from the group consisting of air, water and steam.

* * * * *